United States Patent [19]

Hill et al.

[11] Patent Number: 4,494,714
[45] Date of Patent: Jan. 22, 1985

[54] AUTOMATIC BALLOON LAUNCHING SYSTEM

[75] Inventors: Geoffrey E. Hill, 1789 Country Club Dr., Logan, Utah 84321; Duard S. Woffinden, Logan, Utah

[73] Assignee: Geoffrey E. Hill, Logan, Utah

[21] Appl. No.: 446,656

[22] Filed: Dec. 3, 1982

[51] Int. Cl.³ .............................................. B64B 1/58
[52] U.S. Cl. ...................................... 244/98; 244/31; 116/210; 141/313; 239/2 R; 446/220
[58] Field of Search .................................... 244/31–33, 244/96–99; 46/90; 239/2 R, 14; 116/210, DIG. 9; 251/9; 137/606, 628, 227.5; 141/248, 281, 10, 141/4, 67, 114, 313

[56] References Cited

U.S. PATENT DOCUMENTS

| | | | |
|---|---|---|---|
| 1,103,490 | 7/1914 | Cordray | 239/2 R |
| 3,536,110 | 10/1970 | West | 141/313 |
| 3,575,161 | 4/1971 | London | 251/9 |
| 3,785,557 | 1/1974 | Womack | 239/14 |
| 3,895,649 | 7/1975 | Ellis | 251/9 |
| 3,960,224 | 6/1976 | Silvers | 251/9 |
| 4,167,204 | 9/1979 | Zeyra | 46/90 |
| 4,185,582 | 1/1980 | Bryant | 116/DIG. 9 |

Primary Examiner—Galen L. Barefoot
Attorney, Agent, or Firm—Thorpe, North & Western

[57] ABSTRACT

A system for automatically filling and launching balloons which may be used, for example, for cloud seeding. The system includes a balloon launching station frame, a nozzle mounted on the frame onto which the narrow end of a balloon can be attached so that gas can flow through the nozzle into the balloon, a conduit coupled to a source of gas and to the nozzle for delivering gas through the nozzle into the balloon, gas flow control apparatus responsive to first signals for controlling the flow of gas through the conduit, and a release mechanism responsive to second signals for disengaging the balloon from the nozzle to thereby release the balloon to the atmosphere. For launching a series of balloons, the system may include a plurality of nozzles, conduits, gas flow control mechanisms, and release mechanisms arranged so that after one balloon is filled and released, a second balloon may be filled and launched at a selectable time thereafter, etc. The filling and releasing of the balloons is controlled by an electronic control unit which automatically applies the first and second signals at appropriate times.

17 Claims, 3 Drawing Figures

AUTOMATIC BALLOON LAUNCHING SYSTEM

BACKGROUND OF THE INVENTION

This invention relates to a system for automatically filling and launching balloons in the atmosphere.

The subject of weather modification and control has been a source of interest and study for many years. However, attempts at actual weather control have generally been limited to processes for so-called cloud modification to cause precipitation. To induce precipitation, it is common practice now to "seed" the cloud with artificial ice nuclei, such as silver iodide crystals, which provide sites on which supercooled liquid water (water whose temperature is below 0 degrees C. but which still exists in the liquid phase) can freeze to form ice crystals. When the ice crystals are large enough, they fall as precipitation, either rain, snow, sleet or hail, depending upon other factors such as air currents, temperature and humidity.

Conventional methods of seeding clouds include the use of ground generators to release artificial ice nuclei into the air. However, with this method, artificial ice nuclei are often confined to narrow plumes which may take many hours to reach appropriate cloud altitudes, or may not reach targeted clouds at all because of temperature inversions or an unexpected change in wind direction. Airborne cloud seeding has also been used but it is difficult to realize significant dispersion of the seeding material in the cloud and as a result much of the cloud does not get seeded. There are ways to overcome this problem with airborne seeding, but the solutions can be costly and hazardous (use of more aircraft), time consuming (release the material far upwind and allow it to be carried by air currents to mix with the cloud). Exemplary prior art references dealing with cloud seeding include U.S. Pat. Nos. 3,357,926, 3,545,677, and 3,441,214.

The present invention contemplates the use of balloon launched seeding materials to induce precipitation. Although balloons have long been used to carry instruments into the atmosphere for making various tests, there appears to have been no systems designed for either automatically or remotely filling and launching balloons either for cloud seeding or atmospheric measurements or tests. G. C. Malloney et al, U.S. Pat. No. 3,452,949, discloses a so-called "balloon launching system and method" by which large balloons, of the type used for carrying aloft heavy scientific equipment, are restrained while being inflated. J. W. Sparkman et al, U.S. Pat. No. 3,524,609, discloses a system for launching payload-carrying balloons. The apparatus described in Sparkman et al is primarily designed to keep the strain off payload lines until just prior to the launch of the balloon, and to accommodate changes in wind direction. Neither of the referenced patents suggests that balloons could be utilized to seed clouds and neither discloses an arrangement whereby a series of balloons may be automatically filled and launched.

SUMMARY OF THE INVENTION

It is an object of the invention to provide a system for automatically filling and launching balloons for use in cloud seeding, carrying scientific measuring devices aloft, etc.

It is also an object of the invention to provide such a system which may be operated remotely.

It is an additional object of the invention to provide such a system in which a series of balloons may be automatically filled and launched in sequence.

It is a further object of the invention, in accordance with one aspect thereof, to provide such a system wherein upon launch of a balloon, the balloon payload is automatically activated.

It is another object of the invention to provide a balloon launching system which is simple in design and easy to construct and maintain.

The above and other objects of the invention are realized in a specific illustrative embodiment thereof which includes a frame for supporting the components of the system. These components include a nozzle adapted to allow the mounting thereon of the narrow end of a balloon and to carry gas into the balloon. Also included is a conduit for carrying gas from a gas source to the nozzle and thus into the balloon. A gas flow control mechanism in response to signals produced by control circuitry controls the flow of gas through the conduit. A release mechanism also responds to signals produced at the appropriate time by the control circuitry by disengaging the balloon from the nozzle to thereby release the balloon to the atmosphere.

In accordance with one aspect of the invention, a payload is attached to the balloon and is automatically activated at the time the release mechanism disengages the balloon from the nozzle.

In accordance with another aspect of the invention, a plurality of nozzles, conduits, gas flow control mechanisms, and release mechanisms are employed so that after one balloon is filled and released, a next balloon may be prepared for filling and releasing in the manner described above.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

The balloon filling and launching system of the present invention is especially suitable for launching balloons carrying cloud seeding materials. With the present invention, a series of balloons can be automatically filled and launched at any desired time to better disperse cloud seeding material throughout the cloud and thereby increase the liklihood of inducing precipitation.

Even though the system of the present invention is especially adapted for use in cloud seeding, it will be apparent that the system could be employed for filling and launching balloons to carry aloft a variety of payloads such as atmospheric measuring devices, testing devices, devices for conducting experiments, devices for monitoring air pollution, etc.

Figure 2:
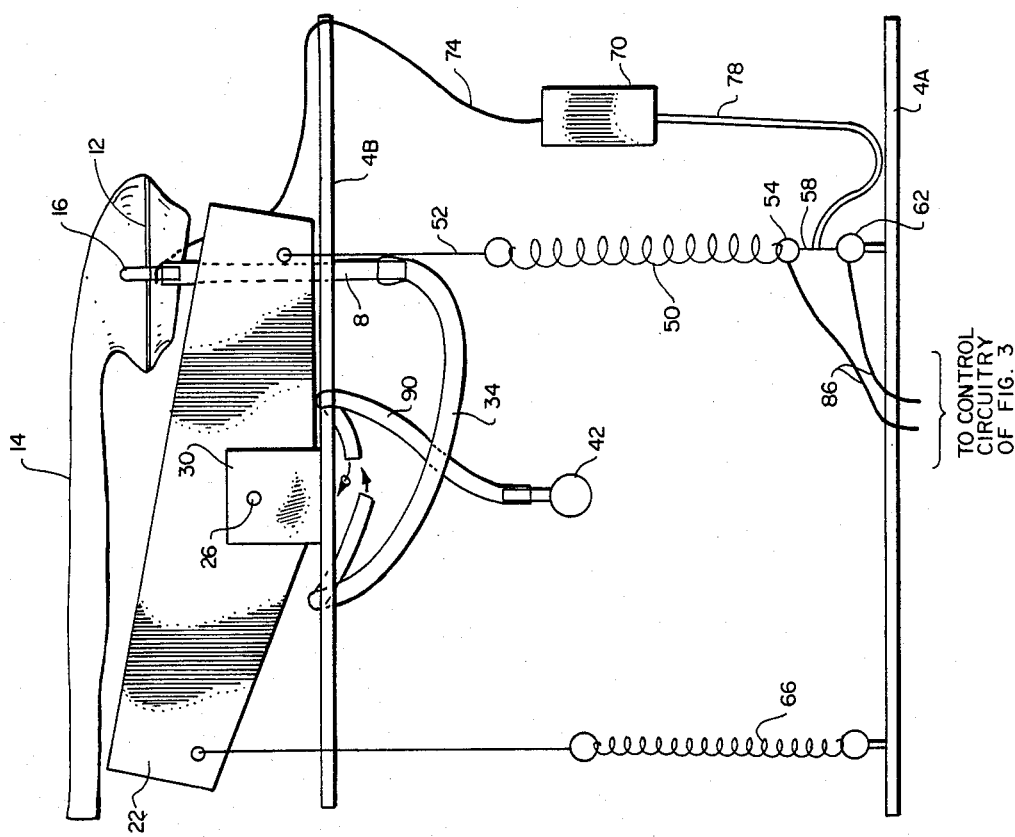
FIG. 2 is a side, elevational view of one of the balloon filling and releasing stations of FIG. 1.
Figure 1:
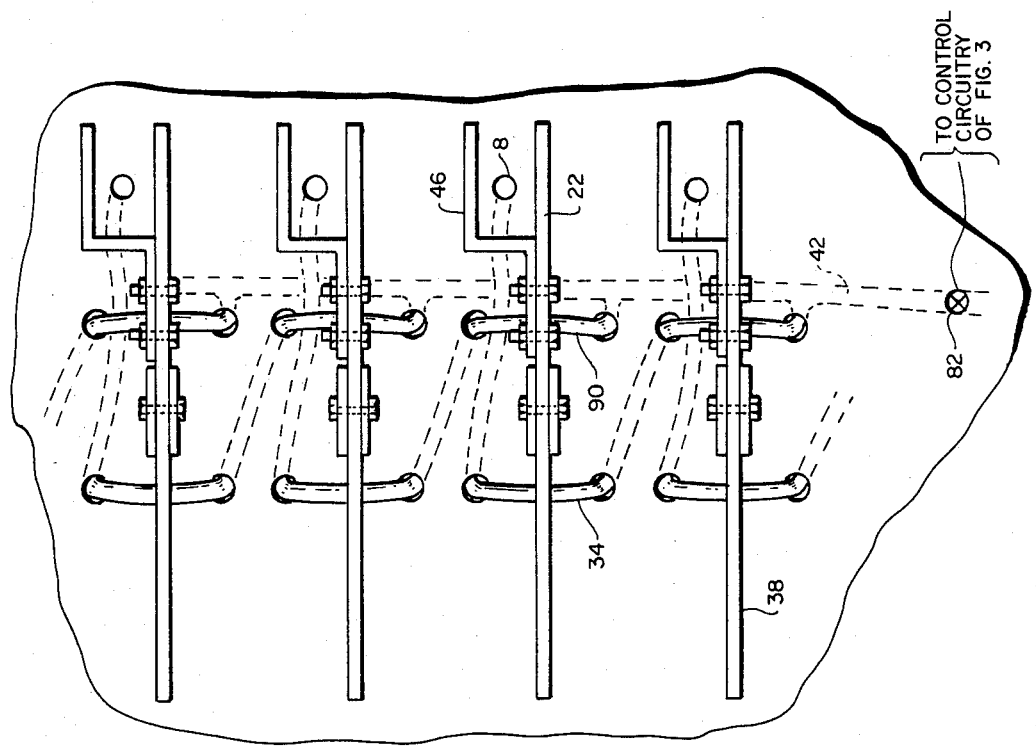
FIG. 1 is a top plan view of a series of balloon filling and releasing stations made in accordance with the principles of the present invention.

Referring to FIGS. 1 and 2, there are shown four balloon launching stations in FIG. 1 and a side, elevational view of one balloon launching station in FIG. 2. The station (FIG. 2) includes a frame having a base 4A and an upper platform 4B. Mounted on the upper platform 4B to extend upwardly is a tubular nozzle 8. The nozzle is provided as a mounting element for balloons to be launched and to convey gas into the balloons.

An illustrative way of mounting the balloons on the nozzle 8 is shown in FIG. 2 to include a disc 12 having a circumference sufficiently large to enable air-tight placement in the narrow end and opening of a balloon 14. As indicated in FIG. 2, the end of the balloon is stretched to accommodate the disc 12 so that the disc is held firmly in place. Carried by the disc 12 is a one-way valve 16 which allows gas to enter the balloon 14 but prevents gas from escaping therefrom. The end of the valve 16 protruding downwardly from the disc 12 is dimensioned to allow pressure fitting of the valve in the upper end of the nozzle 8. Advantageously the nozzle 8 is made of a resilient elastic material such as latex rubber, with an interior dimension just less than the exterior dimension of the valve 16. This facilitates securement of the valve 16, and thus the balloon 14, on the nozzle 8.

Of course other methods could be utilized for securing the balloon 14 to the nozzle 8 such as employment of a septum made of a pliant, resilient material, for example silicone, in the opening in the balloon, and then placement of the balloon on a nozzle formed in the shape of a narrow needle. A needle-like nozzle would be used in this instance so that when the balloon, with the septum, is forced from the nozzle, the septum will close about the opening made by the nozzle to prevent the escape of gas.

Also mounted on the upper platform 4B is a rocker arm 22 arranged to pivot or rock on an axle 26 held in place by a bracket 30. The bracket 30 is attached to the top of the platform 4B. The rocker arm 22 is mounted to rock between a first position (shown in FIG. 2) in which the front end of the rocker arm contacts and presses helium supply tubing 90 (to be discussed momentarily) against the upper platform 4B, and a second position in which the back end of the rocker arm contacts and presses helium supply tubing 34 against the platform 4B.

Coupled to the lower end of the nozzle 8 is a flexible and resilient section of tubing 34 (made of latex for example), which extends upwardly and over a portion of the upper platform 4B (FIG. 1) located underneath the back end of the rocker arm 22. The tubing 34 then extends to an adjacent balloon launching station where it extends upwardly and over another portion of the platform 4B located underneath the front end of the adjacent rocker arm 38 (FIG. 1). From there, the tubing 34 is coupled to a source of helium 42. This source might illustratively be a feeder line leading from a storage tank filled with helium under pressure.

As also best seen in FIG. 1, the front end of the arm 22 extends past one side of the nozzle 8. An accessory arm 46 is attached to the rocker arm 22 to extend transversely of the arm 22 and then parallel therewith and past the other side of the nozzle 8. The accessory arm 46 may be attached by bolts, rivets, or other suitable fastening elements.

Prior to balloon filling and launching, rocker arm 22 is biased to the first position by a coil spring 50, one end of which is coupled by a wire 52 to the front end of the arm 22, and the other end of which is coupled to a conductive ring 54. Another conductive ring 62 is mounted to the base 4A. The two rings are coupled together by a resistance wire 58, made for example of nichrome. Another coil spring 66 similarly joins the back end of the rocker arm 22 to the base 4A.

When the balloon launching system of the present invention is used for cloud seeding, a payload 70, consisting of a pyrotechnic material embedded with silver iodide, is attached by a tether 74 to the valve 16 (or to the disc 12). A fuse 78 is joined at one end to the payload 70 and at the other end to the wire 58. The fuse 78 could be a conventional fuse used to ignite explosives.

To operate the system, a latching solenoid valve 82 (FIG. 1) is opened (by control circuitry of FIG. 3 which will be described later) to allow helium to flow to the feeder line 42. Assuming that balloon 14 of FIG. 2 is the next balloon to be filled, helium would flow via tubing 34 and nozzle 8 through the valve 16 into the balloon. To allow the filling of balloon 14, rocker arm 38 must be in the second position (the corresponding balloon having been launched) so that the helium can flow into nozzle 8. (It should be noted here that the nozzle of the first launching station of an array of stations is connected directly to helium feeder line 42 after passing underneath the back end of the rocker arm of the first station; for the last station of the array, there is no helium supply tubing passing under the front end of the rocker arm for the last station.)

After a predetermined period of time sufficient to allow filling of the balloon 14, a signal is applied to latching solenoid valve 82 to stop the flow of helium. Then, electrical current is applied to conductor wires 86. This current then flows via conductor rings 54 and 62 to the high resistance wire 58 and causes the wire to heat up and vaporize so that the wire is severed. Severing wire 58 releases the coil spring 50 so that the coil spring 66 pulls downwardly on the end of the rocker arm 22 to which it is connected. Rocker arm 22 is thus caused to move from the first position (FIG. 2), where tubing 90 is being pinched closed, to the second position to contact and pinch closed tubing 34. This action stops the flow of helium into balloon 14. As rocker arm 22 moves from the first position to the second position, the front end of the arm contacts balloon 14 and disc 12 to force the balloon off the nozzle 8 and into the atmosphere. Vaporization of the wire 58 serves to ignite the fuse 78 and the ignited fuse and payload 70 are carried aloft with the balloon. Depending upon the length of the fuse 78, payload 70 is ignited or activated sometime after launching to cause release of silver iodide crystals into the cloud being seeded. Of course, the length of the fuse 78 is selected in accordance with the height of the cloud and the rate of ascent of the balloon.

After launching of balloon 14 is completed, the next station in the array is in condition for the balloon mounted on that station to be filled and launched; this will occur upon receipt of appropriate signals from the control circuitry.

After a series of balloons are launched in the manner described (at whatever intervals are desired), the system is reloaded by replacing resistance wires, such as wire 58, and by mounting new balloons onto corresponding nozzles. Finally, payloads are attached to the balloons and appropriate length fuses are coupled to respective resistance wires.

Figure 3:
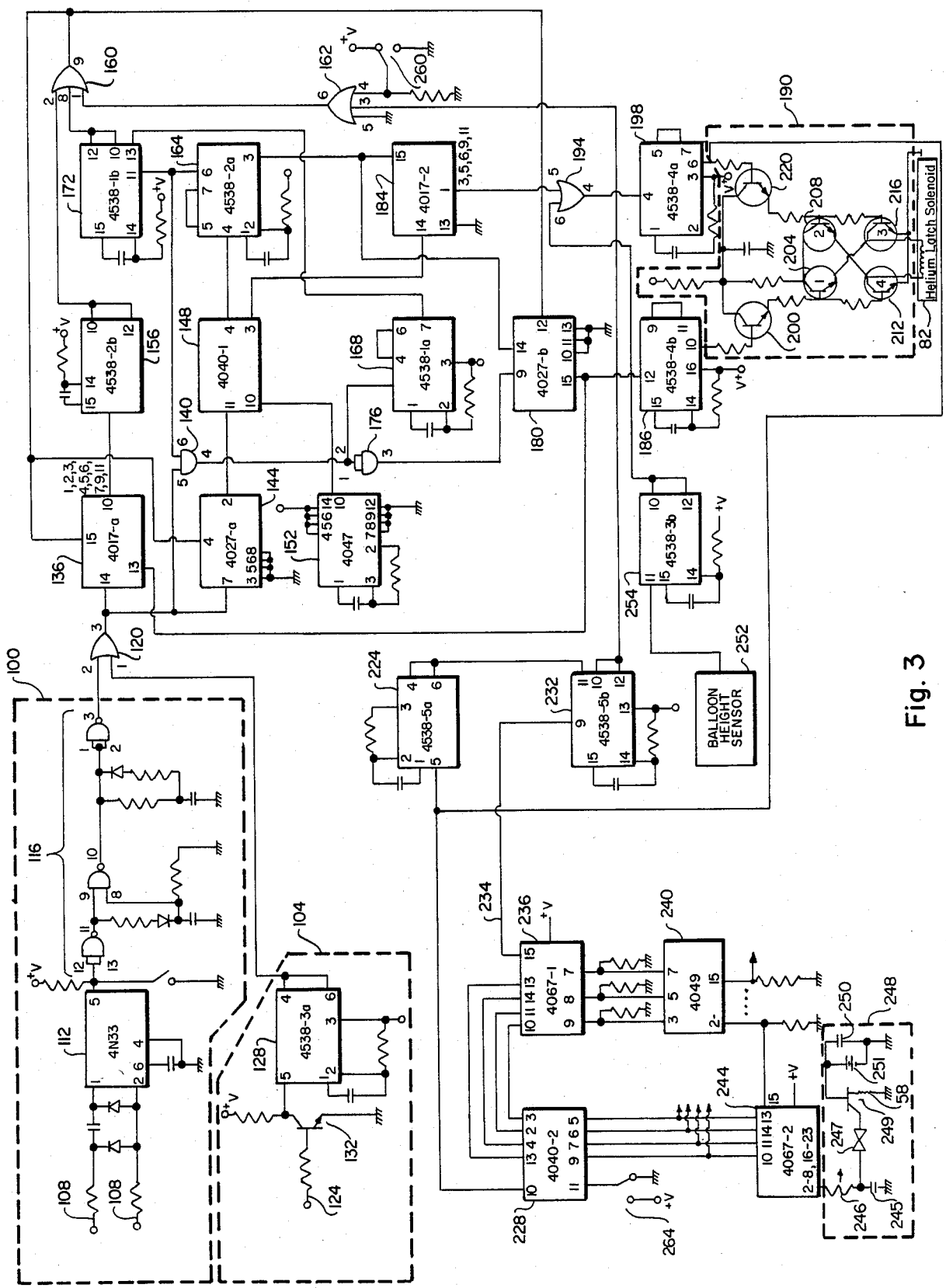
FIG. 3 is a schematic diagram of circuitry for controlling the filling and releasing operations of the stations of FIGS. 1 and 2.

FIG. 3 is a schematic diagram of circuitry for controlling the filling and launching of the balloons from the stations of FIGS. 1 and 2. This circuitry may be activated remotely by a telephone signal or radio signal. The circuitry responds to such activation signals by initiating the sequence of actions described above. Each activation will produce the launching of one balloon.

The circuitry includes a telephone ringing signal detection circuit 100 and a radio signal detection circuit 104. If the balloon filling and launching operation is to be initiated by telephone, then a certain telephone number is dialed to produce a ringing voltage on input lines 108. These input lines are isolated from the rest of the circuitry by an optical coupling device 112 which responds to a ringing voltage by producing an electrical signal which is applied via a filter network 116 to one input of OR gate 120. The signal applied to the OR gate 120 is a positive going signal. A similar positive going signal would be applied to the other input lead of OR gate 120 upon receipt of a radio frequency signal on input lead 124. Such a radio frequency signal might be produced, for example, by a conventional pager. Receipt of a radio frequency signal would cause the transistor 132 to turn on and trigger a monostable multivibrator 128. The multivibrator, in turn, would apply a positive going signal to the OR gate 120.

Whichever method is used for initiating the filling and launching of a balloon, the result is that a positive going electrical signal is passed through OR gate 120 to a decade counter 136, to a NAND gate 140, and to a flipflop 144. The counter 136 is incremented and the flipflop 144 is set to enable a binary counter 148. The binary counter 148 thus begins to count "one-per-second" pulses produced by a time pulse generator 152. One output of the decade counter 136 produces a negative going signal for application to a multivibrator 156 when the counter counts up to some predetermined value (for example six), indicting that either a sequence of six ringing signals or six radio fruency signals have been received by ringing detection circuit 100 or radio frequency signal detection circuit 104 respectively. The multivibrator 156, in turn, produces an output pulse which is applied via OR gate 160 to flipflop 144 to reset the flipflop to its original state. Flipflop 144, in turn, resets the binary counter 148 and this effectively resets the entire system. The reason for resetting the system in the event that some predetermined number of ringing signals or radio frequency signals is received is to preclude initiating the filling and launching of a balloon by someone dialing a wrong telephone number (or calling a wrong pager number) and inadvertently reaching the circuitry of FIG. 3, and then letting the telephone (or pager) "ring" six or more times (or whatever number of times corresponding to the setting of the counter 136). A person desiring to initiate the launch of a balloon, on the other hand, would dial the correct number and allow it to ring only a number of times less than the count set for the counter 136 (for example from one to four times) and then hanging up.

Assuming that no more than the appropriate number of rings are received by the circuitry of FIG. 3, the binary counter 148, once enabled, will count pulses received from the time pulse generator 152 for some predetermined period of time. After the counter 148 has counted over the predetermined period of time, it produces a signal which is applied to a "window generator" multivibrator 164 which, in turn, applies a signal to NAND gate 140. NAND gate 140, however, is not enabled unless a second series of ringing signals or radio frequency signals are received by circuits 100 or 104 respectively. This provides added protection against inadvertent initiation of a balloon launch by a wrong number being dialed. Assuming that a second series of ringing signals or radio frequency signals are received, a signal will be applied via OR gate 120 to the NAND gate 140 to enable the NAND gate and cause it to produce a negative going signal which is applied to a multivibrator 168. This multivibrator generates a "second ring reset inhibit" pulse which is applied to a multivibrator 172. This disables the multivibrator 172 and prevents it from generating a system reset pulse for application to OR gate 160 which would occur if no second series of ringing or radio frequency signals were received. The negative going signal produced by NAND gate 140 is also applied to gate 176 which inverts the signal and applies it to a flipflop 180 to set the flipflop. The flipflop 180, in turn, signals the multivibrator 164 to disable it, and enables a "fill" timer 184. Another output from the flipflop 180 is applied to the decade counter 136 to inhibit any further action by the decade counter in response to additional ringing or radio frequency signals being received by the circuitry during the remainder of the launch process. This same output from the flipflop 180 is also applied to a multivibrator 186 and in response the multivibrator 186 produces a pulse which is applied to "open" the latching solenoid valve 82 (FIGS. 1 and 3). This allows helium to flow via the valve 82 into the helium feeder line 42.

The helium latching solenoid valve 82 is controlled by circuitry 190 of FIG. 3. Very briefly, the signal from the multivibrator 186 turns on transistor 200 which, in turn, turns on transistors 204 and 212. Turning on transistor 204 raises lead B of the helium latching solenoid valve 82 to a positive voltage level. At the same time lead R is placed at ground level by transistor 212. With lead B high and lead R low, the latching solenoid valve 82 is caused to open. The helium latching solenoid valve 82 is maintained open until the "fill" timer 184 reaches a predetermined count selected to allow adequate filling of a balloon with helium. When this occurs, a pulse generated by the fill timer 130 is applied via an OR gate 194 to a multivibrator 198. The multivibrator 198 then signals circuitry 190 to effect closure of the helium latching solenoid valve 82. In particular, a transistor 220 receives a positive pulse from the multivibrator 198 and, in response, it turns on transistors 208 and 216. Transistor 208 raises the voltage level of the R lead of the helium latching solenoid valve 82 and transistor 216 grounds lead B. This, in turn, causes the helium latching solenoid valve 82 to close. An alternate way to terminate the filling the balloon is accomplished by sensing the height of the balloon as it is filled. A balloon height sensor 252 such as a photoelectric cell triggers a multivibrator 254 which feeds a signal through OR gate 194 to trigger the "close" multivibrator 198. The remainder of the launch process is as described previously.

The signal from the multivibrator 198 also triggers a multivibrator 224 and triggers a "balloon station" address counter 228 to count to its next address (the purpose of this will be discussed momentarily). After a delay, the multivibrator 224 triggers a multivibrator 232 causing it to produce a "launch" signal on lead 234. The multivibrator 232 also produces a reset pulse which is fed via an OR gate 162 to OR gate 160 to cause resetting of the entire system as earlier discussed. Simultaneously the signal on lead 234 is passed through a multiplexer 236 to an inverting buffer 240. The channel of inverting buffer 240 through which the signal passes is determined by the address supplied to the multiplexer 236 by the address counter 228. This address, in effect, determines to which balloon launching station a launch current will be supplied. For the first launch, address counter 228 would contain the count 0001, having been incremented from its 0000 position by the pulse from multivibrator 198.

The launch signal applied to the inverting buffer 240 is passed through a multiplexer 244 to a selected launching circuit 248 corresponding to the selected balloon launching station. (There is a launching circuit, such as circuit 248, for each balloon launching station.) It should be noted that, although address counter 228 drives both multiplexer 236 and multiplexer 244, they are driven by different bits. Multiplexer 244 is addressed by the four lowest order bits whereas multiplexer 236 is addressed by the next four higher order bits. Thus, for each address change of multiplexer 236, thee will be sixteen address changes of multiplexer 244. Since address counter 228 is incremented before the first launch, the output of multiplexers 244 (address 0000) is not available and only 15 launches can be made by first multiplexer 244. Subsequent multiplexers for additional launches (as indicated by the dots on the output of buffer 240) would each have a capability of initiating sixteen launches, and since buffer 240 has six channels, it could feed a total of six multiplexers for a maximum of 15+5×16=95 launches. The inclusion of two additional inverting buffers would expand the capability of the system up to a maximum of 255 launches.

Launching circuit 248 is activated by the launching signal from multiplexer 244. This signal causes a capacitor 245 to begin charging through resistor 246. When the breakdown voltage of a diac 247 is reached, capacitor 245 discharges into an SCR 249 which then fires and discharges a capacitor 250 (which has been charged by a battery 251) into resistance wire 58 (FIGS. 2 and 3). The combination energy source of capacitor 250 and battery 251 causes sufficient current through resistance wire 58 to vaporize it. The heat thus produced ignites the fire 78 of FIG. 2 as previously discussed.

There are a number of manually operated reset switches including switch 260 which, when closed to ground, resets the system, and switch 264 which, when closed to a voltage source, resets the address counter 228.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for automatically launching balloons comprising
    a balloon station frame,
    nozzle means mounted on the frame on which the narrow end of a balloon may be mounted and through which gas may flow into the balloon,
    conduit means for supplying gas to the nozzle means,
    valve means responsive to first signals for controlling the flow of gas through the conduit means to prevent the flow of gas when closed and allow the flow of gas when opened,
    release means responsive to second signals for separating the balloon from the nozzle means to thereby release the balloon to the atmosphere, and
    control circuit means for producing the first and second signals, said control circuit means including
    means for detecting a remotely generated signal and for producing a launch initiation signal in response thereto,
    valve control means responsive to the launch initiation signal for applying an open signal to the valve means to cause the valve means to open and allow the flow of gas, and for applying a close signal to the valve means a period of time after application of the open signal to cause the valve means to close.

2. A system as in claim 1 further comprising
    a disc dimensioned for air-tight placement in the narrow end of the balloon when the narrow end is stretched, and
    a one-way mounted in the disc to allow gas to enter the balloon while preventing the escape of gas from the balloon, said valve being mountable on the nozzle means to receive gas therefrom.

3. A system as in claim 1 wherein said valve control means includes
    a timer which may be set to time over selectable periods of time and which is responsive to said open signal to begin timing, and
    means for producing said close signal after the time has timed over the selected period.

4. A system as in claim 3 wherein said control circuit means further comprises release control means responsive to said close signal for producing said second signals.

5. A system as in claim 1 wherein said detecting means comprises means for detecting telephone ringing signals received over an input line.

6. A system as in claim 1 wherein said detecting means comprises means for detecting radio frequency signals received over an input line.

7. A system as in claim 1 wherein said valve control means includes means for inhibiting production of said open and close signals if more than a certain number of launch initiation signals are produced.

8. A system as in claim 7 wherin said valve control means includes means for inhibiting production of said open and close signal if less than two sequences of launch initiation signals are produced within a predetermined period of time.

9. A system for automatically filling and launching a plurality of balloons comprising
    a plurality of nozzles on each of which the narrow end of a balloon may be mounted and through which gas may flow into a balloon mounted thereon,
    a plurality of flexible and resilient conduits, each coupled to a gas supply and to a different nozzle for supplying gas to the nozzle,
    a plurality of movable elements, each associated with a different nozzle and each movable between a first position, in which said each element contacts and closes a conduit coupled to a next adjacent nozzle, and a second position, in which said each element moves out of contact with the conduit which is coupled to the next adjacent nozzle to allow gas to flow therethrough and into contact with the conduit which is coupled to the associated nozzle to thereby pinch the conduit and prevent the flow of gas therethrough.

10. A system as in claim 9 further comprising a support frame, and wherein said movable elements each comprise a rocker arm mounted on the support frame to rock between the first position in which the arm pinches against the frame the conduit coupled to the next adjacent nozzle, and the second position in which the arm pinches against the frame base the conduit coupled to the associated nozzle.

11. A system as in claim 10 wherein each of said rocker arms is positioned so that as the arm is moved from the first position to the second position it contacts the balloon on the associated nozzle to force the balloon from the nozzle.

12. A system for automatically launching balloons comprising
a balloon station frame,
nozzle means mounted on the frame on which the narrow end of a balloon may be mounted and through which gas flow into the balloon,
conduit means for supplying gas to the nozzle means,
gas flow control means responsive to first signals for controlling the flow of gas through the conduit means,
release means responsive to second signals for separating the balloon from the nozzle means to thereby release the balloon to the atmosphere,
wherein said gas flow control means and release means comprise a movable element for contacting and forcing the balloon from the nozzle and simultaneously preventing the flow of gas to the nozzle, and
control means for producing the first and second signals.

13. A system as in claim 12 wherein said conduit means comprises flexible tubing, and wherein said movable element comprises a rocker arm mounted on the frame to rock between a first position, in which the arm is out of contact with the flexible tubing, and a second position, in which the arm contacts and pinches closed the flexible tubing to prevent the flow of gas to the nozzle.

14. A system as in claim 13 wherein said nozzle comprises an upwardly extending tube, and wherein said tube and said rocker arm are positioned so that as the arm is moved from the first position to the second position, the arm contacts the balloon to force it off the upwardly standing tube.

15. A system as in claim 14 wherein said release means further comprises
first biasing means for normally biasing the rocker arm to the first position, said first biasing means including a bias release element responsive to an electrical signal for releasing the first biasing means from biasing the rocker arm, and
second biasing means for biasing the rocker arm to the second position upon release of the first biasing means.

16. A system as in claim 15 wherein said first and second biasing means comprise springs, the second of which couples one end of the arm to the frame, and wherein the bias release element comprises a resistance element which heats up and severs in response to the electrical signal, said first biasing spring and resistance element being coupled in series to couple the other end of the arm to the frame.

17. A system as in claim 16 further comprising
a package of ignitable cloud seeding material which is released to the atmosphere upon ignition,
a fuse coupled at one end to the package and at the other end to the resistance element so that upon heating and severance of the resistance element, the fuse is ignited.

* * * * *